(12) United States Patent
Peri et al.

(10) Patent No.: US 12,212,137 B2
(45) Date of Patent: Jan. 28, 2025

(54) SYSTEM AND METHODS FOR REGULATING CONNECTIONS OF LOADS TO A NETWORK

(71) Applicant: Solaredge Technologies Ltd., Herzeliya (IL)

(72) Inventors: Amir Peri, Kochav Yair (IL); Alon Zohar, Netanya (IL); Yakir Loewenstern, Ariel (IL); Ilan Yoscovich, Givatayim (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/149,258

(22) Filed: Jan. 3, 2023

(65) Prior Publication Data
US 2023/0216297 A1    Jul. 6, 2023

Related U.S. Application Data

(60) Provisional application No. 63/296,228, filed on Jan. 4, 2022.

(51) Int. Cl.
*H02J 3/00* (2006.01)
*H02J 3/38* (2006.01)

(52) U.S. Cl.
CPC .............. *H02J 3/007* (2020.01); *H02J 3/38* (2013.01)

(58) Field of Classification Search
CPC ................................... H02J 3/007; H02J 3/38
See application file for complete search history.

(56) References Cited

U.S. PATENT DOCUMENTS

| 2013/0123998 | A1 | 5/2013 | King et al. | |
|---|---|---|---|---|
| 2015/0222120 | A1* | 8/2015 | Aisa | H02J 13/00004 307/31 |

OTHER PUBLICATIONS

May 9, 2023—European Search Report—EP App. No. 23150184.2.

* cited by examiner

*Primary Examiner* — Daniel Cavallari
(74) *Attorney, Agent, or Firm* — Banner & Witcoff, Ltd.

(57) ABSTRACT

A system includes a central controller for determining at least one parameter for a load connector of a load. The system also includes a central transceiver for transmitting a signal relating to the least one parameter of the load connector. The load connector comprises input terminals for connecting to power lines of a power distribution network, output terminals for connecting to the load, a switch for connecting/disconnecting the input terminals to/from the output terminals, a connector transceiver for receiving the signal, a voltage sensor for measuring a voltage across the input terminals, and a connector controller. The connector controller may determine a voltage disconnect threshold for the load connector based on the at least one parameter. The connector controller may control the switch to connect the output terminals to the input terminals based on a voltage measurement and the voltage disconnect threshold.

10 Claims, 10 Drawing Sheets

SYSTEM AND METHODS FOR REGULATING CONNECTIONS OF LOADS TO A NETWORK

CROSS-REFERENCE TO RELATED APPLICATION

This application claims the benefit of U.S. Provisional Application No. 63/296,228, filed on Jan. 4, 2022. The entire disclosure of the foregoing application is incorporated by reference in its entirety.

FIELD OF THE APPLICATION

The application relates generally to power systems. More specifically, the application provides a system and methods for regulating connections of loads to a network.

BACKGROUND

Some electrical systems may include a load or a group of loads, and an input power source or power sources providing power to these loads. Such power sources may be a main power grid or an alternative power generation system. For example, a user premise (e.g. a house or an office) may be connected to a main power grid as well as to an independent power generation system. The user premise may be connected to an independent power generation system. The independent power generation system may be an alternative power source, such as a backup storage device (e.g., a battery, flywheel, capacitor and/or supercapacitor), or a renewable energy source (e.g., a photovoltaic array, a wind turbine, or an array of wind turbines). In some cases, the independent power generation system may operate in an off-grid state. In the off-grid state, the user premise may not receive energy from the power grid (e.g., by choice or in an event of an emergency situation which interrupts the power supplied from the main grid). In the off-grid state, there may be a risk that the independent power generation system may produce less power than required by the user premise (e.g., by electrical appliances in the home). Nevertheless, the independent power generation system may be useful for certain appliances to remain powered. For example, in a house or office, the independent power generation system may be useful that a life support system, refrigerator, or security cameras may continue working during such an event as an emergency situation, while a treadmill, a television or a microwave may be disconnected from the independent power generation system to save power.

SUMMARY

The following summary presents a simplified summary of certain features. The summary is not an extensive overview and is not intended to identify key or critical elements A system may include power lines of a power distribution, a central transceiver, and at least one load connector for a corresponding at least one load. The at least one load connector may include input terminals, output terminals, a connector transceiver, a voltage sensor, and a connector controller. The power lines may be configured to provide power to one or more loads. The at least one load of the one or more loads may be configured to be connected to a network (e.g., a power distribution network) via the corresponding load connector. The central controller may be configured to determine at least one parameter for the corresponding load connector. The central transceiver may be connected to the central controller, and configured to send a signal relating to the least one parameter of the corresponding load connector. The input terminals of the load connectors may be configured to be connected to the power lines of the power distribution network. The output terminals of the load connector may be configured to be connected to the load. The at least one switch may be configured to connect the input terminals to the output terminals or disconnect the input terminals from the output terminals. The connector transceiver may be configured to receive the signal relating to the at least one parameter of the corresponding load connector. The voltage sensor may be connected across the input terminals, and configured to measure a voltage across the input terminals. The connector controller may be coupled to the connector transceiver, to the at least one switch, and to the voltage sensor. The connector controller may be configured to determine at least one of a voltage disconnect threshold or a connect parameter threshold for the corresponding load connector based on the at least one parameter received by the connector transceiver, and to control the at least one switch to connect the output terminals to the input terminals or disconnect the output terminals from the input terminals based on a voltage measurement of the voltage, and at least one of the voltage disconnect threshold or the connect parameter threshold.

A method may include determining at least one parameter for at least one load connector of a plurality of load connectors. The at least one load connector may be configured to connect a corresponding load to a power distribution network. The method may further include sending to the at least one load connector a signal relating to the at least one parameter, and determining by the load connector at least one of a voltage disconnect threshold or a connect parameter threshold from the corresponding signal relating at least one parameter. The method may also include measuring by the load connector the voltage at respective input terminals of the load connector, and disconnecting the load from the power distribution network or connecting the load to the power distribution network based on, a status of the load, a measured voltage at the input terminals of the load connector, and at least one of a voltage disconnect threshold or a connect parameter threshold.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
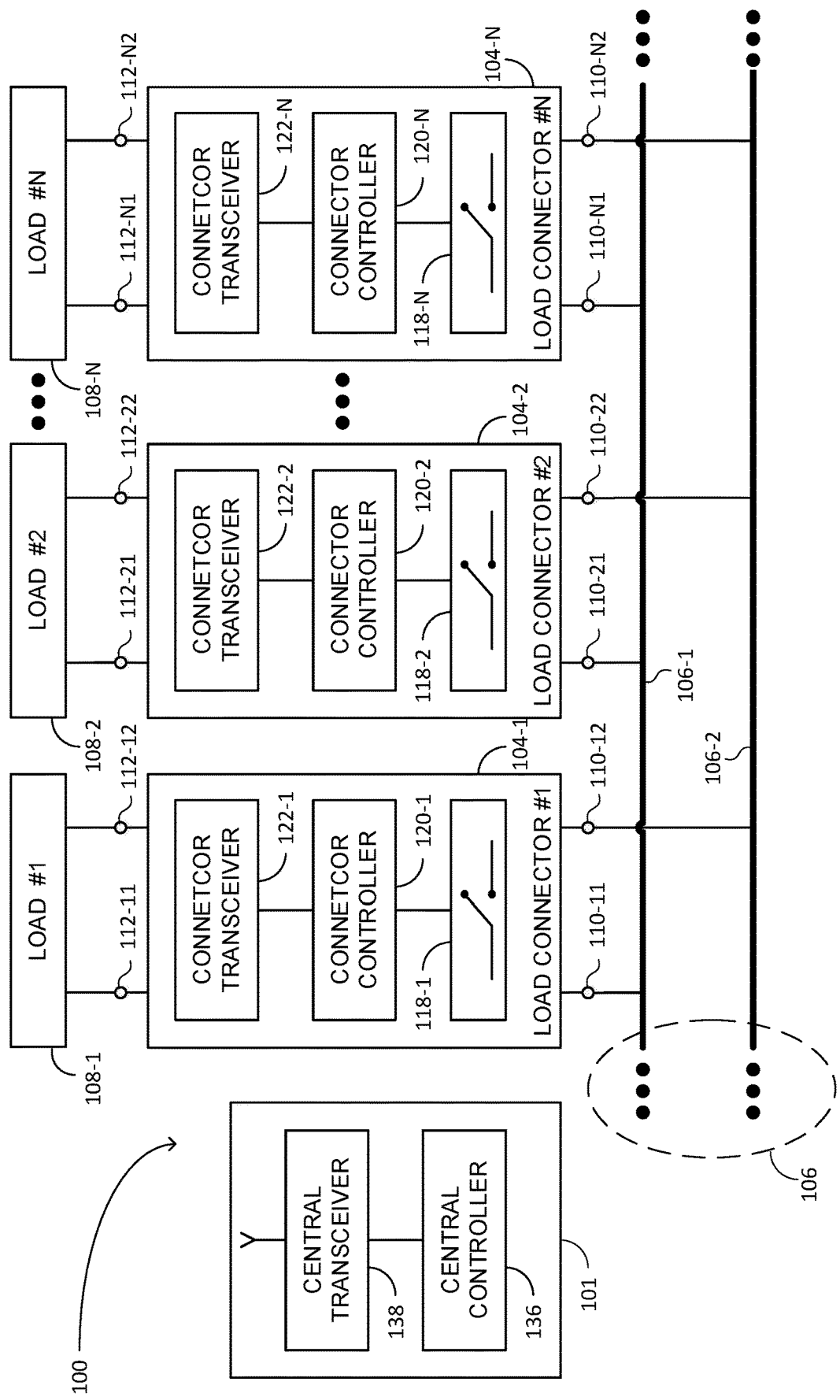
FIGS. 1A-1C show examples of a system for regulating a connection of loads to a power distribution network.

The accompanying drawings, which form a part hereof, show examples of the disclosure. It is to be understood that the examples shown in the drawings and/or discussed herein are non-exclusive and that there are other examples of how the disclosure may be practiced.

A system and a method for regulating a connection of loads to a power distribution network in a user premise are described herein. The power distribution network may be an AC network (e.g., single phase, three-phase), or a DC home network. For example, the user premise may be connected to an alternative power generation system which may operate in an off-grid state. A central controller, which may be located in a central circuit (e.g., an inverter, a combiner, or a dedicated system control circuit), may determine one or more load connection parameters for a load connector, or for one or more of a plurality of load connectors. The load connection parameter may be one or more of a voltage disconnect threshold, a voltage disconnect range, a voltage connect threshold, a voltage connect range, a frequency connect threshold, or a frequency connect range. The central circuit may comprise a transceiver configured to send (e.g., transmit) a signal corresponding to the load connection parameters to one or more respective load connectors. If the load connection parameters include a voltage disconnect range, a load connector may adjust a corresponding voltage disconnect threshold to be within the voltage disconnect range. Similarly, if the load connection parameters include a voltage connect range, the load connector may adjust a corresponding voltage connect threshold to be within the voltage connect range. The load connector may include a voltage sensor which senses a voltage across power lines of a power distribution network. If the voltage across the power lines of the power distribution network reduces below a corresponding voltage disconnect threshold, the load connector may disconnect a load, which is previously connected to the power distribution network (e.g., via the load connector), from the power distribution network. If the voltage across the power lines of the power distribution network increases above a corresponding voltage connect threshold, the load connector may connect a load, which is previously disconnected from the power distribution network, to the power distribution network. The load connection parameters of the loads may be prioritized. Prioritizing the load connection parameters may result in disconnecting or connecting loads in cascade.

Figure 1B:
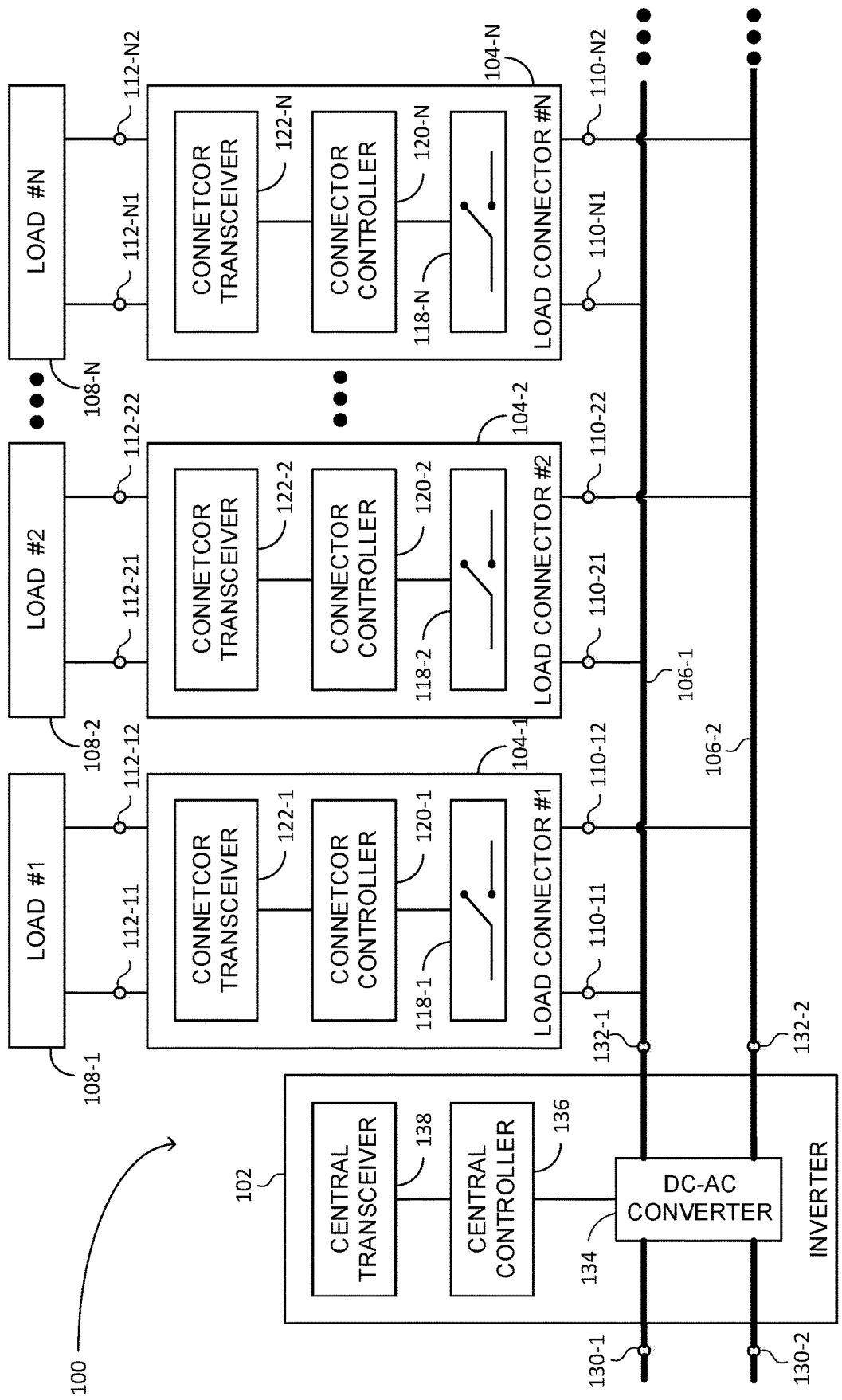
Figure 1C:
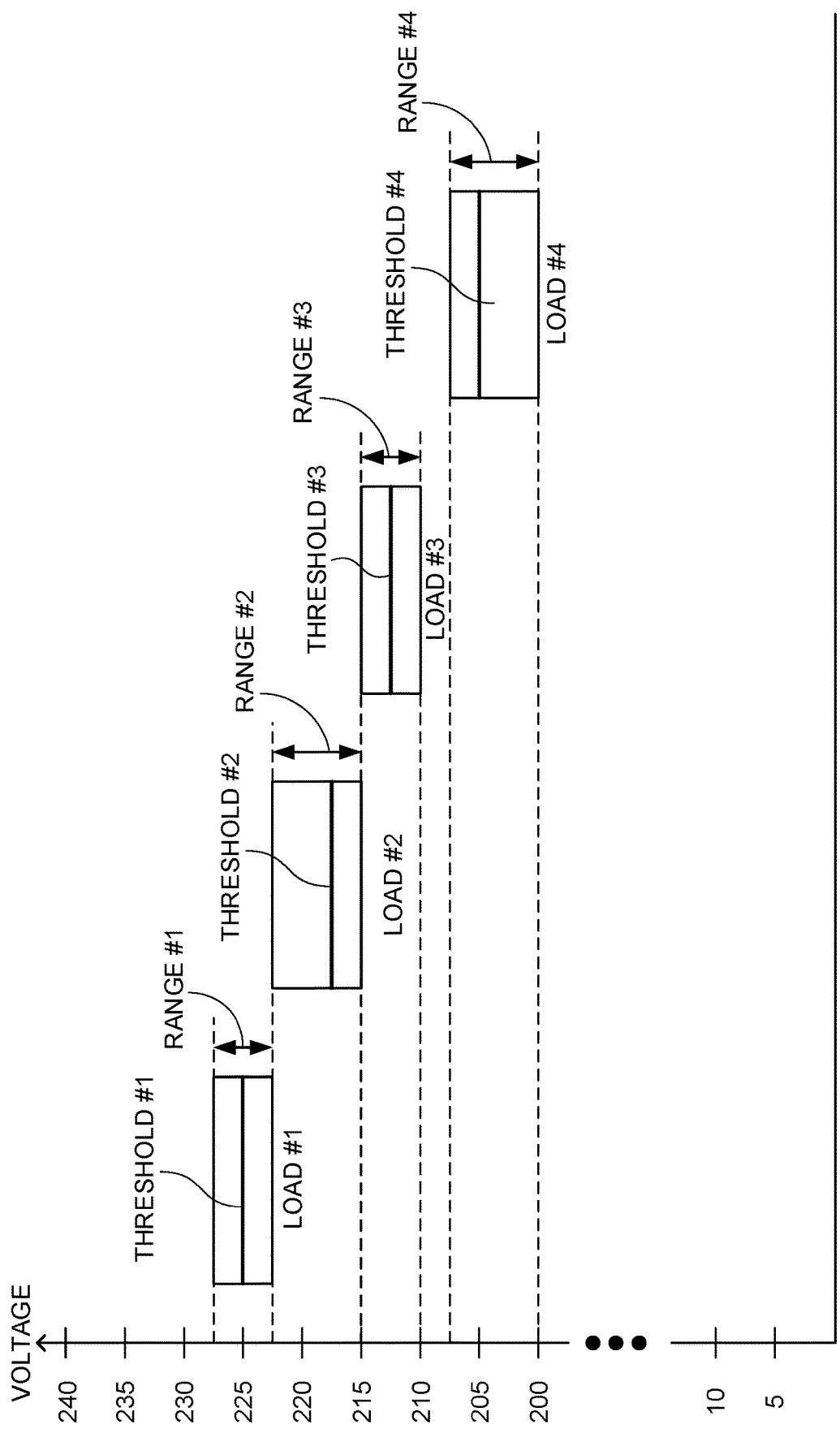

FIGS. 1A, 1B, and 1C show examples of a system 100 for regulating a connection of loads to power lines 106-1 and 106-2 (collectively referred to as power distribution network 106). The system 100 may comprise a central circuit 101 and a plurality of load connectors 104-1, 104-2, . . . , 104-N (collectively or generically, load connectors 104). FIGS. 2A-2D show examples of the load connector 104. The load connector 104 may comprise at least two input terminals 110-1 and 110-2, at least two output terminals 112-1 and 112-2, at least one switch 118, a connector controller 120, and a connector transceiver 122. The connector controller 120 may be coupled to the connector transceiver 122 and to the switch 118. The central circuit 101 may include a central controller 136 and a central transceiver 138 coupled to the central controller 136. FIG. 1B shows that the central circuit 101 may be an inverter 102 (e.g., DC-AC inverter, AC-AC inverter, DC-DC inverter). The inverter 102 may further comprise input terminals 130-1 and 130-2, at least two output terminals 132-1 and 132-2, and a DC-AC converter 134. The inverter 102 may produce a single phase (1Φ) alternating current (AC) power or three phase (3Φ) AC power (e.g., connected in a Delta (Δ) configuration or a star (Y) configuration). The input terminals 130-1 and 130-2 may be connected to a power source such as a renewable energy source (e.g., a photovoltaic array, a wind turbine, or an array of wind turbines), a backup storage device (such as a battery, flywheel, capacitor and/or supercapacitor), or both.

The power distribution network 106 of FIG. 1A or 1B may be a single phase AC network (e.g., a home power distribution network). The power distribution network 106 may be a DC home network. In FIGS. 2A-2D, the input terminals 110-1 and 110-2 of the load connector 104 may be connected respectively to power lines 106-1 and 106-2 of the power distribution network 106 (e.g., of a user premise such as a home). The input terminal 110-1 of the load connector 104 may be connected to the power line 106-1 (e.g., a phase) of the power distribution network 106, and the input terminal 110-2 of the load connector 104 may be connected to the power line 106-2 (e.g., a neutral) of the power distribution network 106. The output terminals 112-1 and 112-2 of the load connector 104 may connected to a respective load 108 (e.g., loads 108-1, 108-2, . . . , 108-N respectively in FIGS. 1A and 1B). In FIG. 1B, if the central circuit 101 is an inverter 102, the inverter 102 may produce a single phase of power, and the output terminals 132-1 and 132-2 may be connected to the power distribution network 106. For example, the output terminal 132-1 may be connected to the power line 106-1 of the power distribution network 106 and the output terminal 132-2 may be connected to the power line 106-2 of the power distribution network 106.

The system 100 may be installed in a user premise (e.g., a home, an office, or a factory). The system 100 may be configured to operate in an off-grid state. The system 100 may regulate power consumption of loads in the user premise by disconnecting and connecting loads from the power distribution network 106. For example, if the power supplied to the premise is not sufficient to operate the loads, the load connectors 104 may disconnect loads from the power distribution network 106 based on the load connection parameters received from the central circuit 101. If the power supplied to the premise is sufficient to operate the loads, the load connectors 104 may connect loads to the power distribution network 106 based on the load connection parameters received from the central circuit 101.

In the system 100, the central circuit 101 may communicate with the load connectors 104. For example, the central circuit 101 may send (e.g., transmit) signals relating to various parameters (e.g., load connection parameter) to the load connectors 104. One or more of the load connectors 104 may send (e.g., transmit) a signal related to at least one of: a status of the load connector 104 (e.g., connected, or disconnected), the power consumed by the load, the temperature of the load connector 104, the current through, or the voltage across the input terminals 110 of the load connector 104. The connector transceiver 122 and central transceiver 138 may be configured to communicate there between based on a transmission protocol defining transmission frequencies, a modulation scheme (e.g., Amplitude shift keying (ASK), Frequency shift keying (FSK), Quadrature Phase Shift Keying (QPSK), Quadrature Amplitude Modulation (QAM)), multiple access schemes (e.g., Time Division Multiple Access (TDMA), Time Division Multiple Access (FDMA), Code Division Multiple Access (CDMA), Carrier Sense Multiple Access (CSMA), Aloha), encoding/decoding schemes (e.g., Non Return to Zero (NRZ), Manchester coding, Block coding), or the like. The communication between the connector transceiver 122 and central transceiver 138 may be over various mediums such as wireless, power lines, telephone lines, internet lines or dedicated lines. The communication between the connector transceiver 122 and central transceiver 138 may be in a variety of communication protocols such as ZigBee™, ZigBee home automation, Wi-Fi, Bluetooth™ x10, Ethernet, various cellular protocols, or Power lines communication (PLC). For example, the connector transceiver 122 and the central transceiver 138 may communicate with each other by modulating a high frequency signal (e.g. at a frequency up to 1 kHz, 10 kHz, 100 kHz, 1 MHz, or higher) across the power lines. PLC may use the existing wires for power as network cables for communication. The central transceiver 138 may send a plurality of signals to all the load connectors 104, a subset of the load connectors 104, or a selected one of the load connectors 104 (e.g., the central transceiver 138 may send (e.g., transmit) a broadcast, multicast, or unicast signals).

The connector controller 120 or the central controller 136 may comprise a microcontroller, a Field Programmable Gate Array (FPGA), or an Application Specific Integrated Circuit (ASIC), configured to carry out a set of control instructions.

The central controller 136 may determine one or more load connection parameters corresponding to one or more of the loads 108. The central transceiver 138 may send a signal corresponding to the one or more load connection parameters to a respective connector transceiver 122. For example, the load connection parameter may include voltage disconnect parameters, voltage connect parameters, or both. The voltage disconnect parameters may indicate a voltage disconnect threshold of the load connector 104 (e.g., 210V AC RMS, 210V DC). The voltage disconnect parameters may indicate a voltage disconnect range. The voltage disconnect range may be defined by a lower voltage disconnect level and an upper voltage disconnect level (e.g., 205V-212V AC RMS, 205V-212V DC). The voltage disconnect parameters may indicate both the voltage disconnect threshold and the voltage disconnect range. For examples, the voltage disconnect parameters may indicate a voltage disconnect threshold (e.g., as an initial threshold) defined by a lower and upper voltage disconnect levels (e.g., 210V, 205V-212V). For examples, the voltage disconnect range may be defined by a positive deviation and a negative deviation (e.g., +2V, −5V) from a voltage disconnect threshold. In such examples, the voltage disconnect parameters may include the voltage disconnect threshold, and the positive and negative deviations from the voltage disconnect threshold (e.g., 210V, +2V, −5V). In such cases, the voltage disconnect threshold may be predetermined. For example, the voltage disconnect parameters may be a voltage disconnect function relating to the power consumption of the load 108. The voltage disconnect function may be defined over a voltage disconnect range and parameters of the voltage disconnect function. For a linear function, the disconnect parameters may be the voltage disconnect range and a slope of the function (e.g., 205V-212V 2V/W). The voltage disconnect parameters may further include an initial voltage disconnect threshold, in addition to the voltage disconnect range and slope of the function (e.g., 210V, 205V-212V, 2V/W). If the voltage disconnect function is a second-order polynomial function, the parameters of the voltage disconnect function may be the three coefficients of the second-order polynomial (e.g., A, B and C of $AX^2+BX+C$). The load connection parameters may be, for the load connector 104 of priority n, the disconnect or connect thresholds of the load connector 104 of priority n+1, and the disconnect or connect threshold of the load connector 104 of priority n−1. For example, the voltage disconnect or connect range of the load connector 104 may be defined by the thresholds of the load connectors 104 with a priority above and below the load connector 104.

If one or more load connection parameters include a voltage disconnect range, and the voltage disconnect range is defined by an upper and lower voltage levels, the connector controller 120 may set the corresponding voltage disconnect threshold within the voltage disconnect range (e.g., based on the power consumption of the respective load). If the voltage disconnect range is defined either by an upper and lower voltage levels, or by a voltage disconnect threshold and deviations from the voltage disconnect threshold, the connector controller 120 may adjust the voltage disconnect threshold (e.g., based on the power consumption of the respective load). For example, if the power consumption of the respective load 108 increases, the connector controller 120 may increase the voltage disconnect threshold accordingly within the voltage disconnect range. If the power consumption of the respective load 108 decreases, the connector controller 120 may decrease the voltage disconnect threshold accordingly within the voltage disconnect range. For example, the load 108 may be an air conditioner. The operation of the air conditioner may transition between "compressor-on mode" in which a compressor of the air conditioner may be active, to "fan mode" in which the compressor may be inactive and the fan may be operative. In the compressor-on mode, the air conditioner may consume 1500 Watts (hereinabove and below abbreviated "W"). In the fan mode, the air conditioner may consume 100 W. The load connector 104 corresponding to an air conditioner load may have received a voltage disconnect range between 210 Volts (hereinabove and below abbreviated "V") and 220V. In the compressor-on mode, the connector controller 120 of the load connector 104 corresponding to the air conditioner may set the voltage disconnect threshold to 219V. In the fan mode, the connector controller 120 of the load connector 104 corresponding to the air conditioner may adjust the voltage disconnect threshold to 210V. For example, the load connector 104 may determine that the air conditioner may be either in the compressor-on mode or the fan mode based on sensing the current through the input terminal 110-1 or through the input terminal 110-2. In the compressor-on mode, the current flowing through the input terminals 110-1 or 110-2 may be higher than the current flowing through the input terminals 110-1 or 110-2 in the fan mode.

The central controller 136 may be configured to determine a plurality of voltage disconnect parameters, based on a user defined priority. According to one example, the user defined priority may be a load disconnect priority, where the load 108 with the highest priority may disconnect first and the load 108 with the lowest priority may disconnect last. According to another example, the user defined priority may be a load operation priority, where the load 108 with the highest priority may disconnect last and the load 108 with the lowest priority may disconnect first. The central controller 136 may include a user interface (e.g., a screen, a keyboard, a mouse, or a touchscreen, etc.) enabling a user to provide the central controller 136 the user defined priority. The central controller 136 may determine the plurality of voltage disconnect parameters based on power ratings of corresponding loads 108 of the load connectors 104. The power ratings of the loads 108 may also be received from the user interface of the central controller 136 or may be acquired from a database. The central controller 136 may further determine the plurality of voltage disconnect parameters based on a reaction time of the respective load connector 104. For example, the load connector 104-1 may use a different switch of switches from the load connector 104-2, which may result in different reaction times of the load connectors 104. For example, some of the load connectors 104 with a relatively-slow reaction time (e.g., on the order of tens of milliseconds) may be associated with a voltage disconnect threshold higher than a voltage disconnect threshold of some of the load connectors 104 with a relatively-fast reaction time (e.g., on the order of milliseconds). The central controller 136 may determine the plurality of voltage disconnect parameters based on a combination of user defined priority, power ratings, or reaction time of the loads 108. For example, a combination of priorities may be defined based on a sum of indexes of priorities in different priority lists (e.g., one of the load connectors 104, which is $1^{st}$ in a user priority list, $4^{th}$ in a power ratings priority list, and $3^{rd}$ in a reaction time list, may receive a score of 1+4+3=8). The central controller 136 may be configured to determine the plurality of voltage disconnect parameters applying Artificial Intelligence (AI) techniques using historical data relating to a voltage in the power distribution network 106. Prioritizing the voltage disconnect parameters may result in disconnecting the loads 108 in cascade. For example, as a voltage across the power distribution network 106 reduces, the loads 108 may disconnect one at a time, according to a respective voltage disconnect threshold of a respective load 108. Disconnecting the loads 108 in cascade may have an advantage that, if the voltage across the power distribution network 106 stabilizes (e.g., returns to a nominal value such as 230V or above a voltage disconnect threshold), the loads 108 that are still connected to the power distribution network 106 may not be disconnected from the power distribution network 106. If voltage parameters (e.g., voltage disconnect parameters, or voltage connect parameters) include a voltage range (e.g., a voltage disconnect range, or a voltage connect range), ranges of the loads 108 may not overlap, thus, reducing a probability of altering load disconnection or connection orders (e.g., which may be based on user priorities).

The load connection parameters may include connect parameters. The connect parameters may include a connect parameter threshold, a connect parameter range, or a connect instruction. The connect parameter threshold may be a voltage connect threshold or a frequency connect threshold. The connect parameter range may be a voltage connect range or a frequency connect range. The connect instruction may be an instruction, which may be sent by the central circuit 101 to one or more of the load connectors 104. The load connectors 104 that received the connect instruction may connect corresponding loads 108 thereof, to the power distribution network 106. The central transceiver 138 may send (e.g., transmit) one or more signals relating to one or more connect instructions, and the connector transceiver 122 may receive the one or more signals. Based on receiving a connect instruction, the connector controller 120 may control the switch 118 to connect the load 108 to the power distribution network 106.

A voltage connect threshold may define a voltage at which the load connector 104 may connect the load 108 to the power distribution network 106 (e.g., based on the load 108 being disconnected from the power distribution network 106). The voltage connect threshold may be a single threshold for all the load connectors 104. One of the load connectors 104, or a group of load connectors 104, may be associated with a corresponding voltage connect threshold. The inverter 102 may temporarily increase a voltage across the power distribution network 106 (e.g., if the inverter 102 receives sufficient power from a power source). For example, the inverter 102 may temporarily increase a voltage across the power distribution network 106 above a nominal value of the power distribution network 106 (e.g., the voltage connect threshold is higher the voltage disconnect threshold). The load connectors 104 may sense the voltage across the power distribution network 106. Based on the voltage being above a corresponding voltage connect threshold of the load connector 104, the connector controller 120 may control the switch 118 to connect the load 108 to the power distribution network 106. If the connect parameters include a voltage connect range, the ranges of the loads 108 may not overlap, thus, reducing a probability of altering a load connection order (e.g., which may be based on user priorities). The connector controller 120 may determine or adjust the voltage connect threshold within the voltage connect ranges.

The inverter 102 may iteratively connect the loads 108 to the power distribution network 106. If one of the load connectors 104 is associated with a corresponding voltage connect threshold, the inverter 102 may temporarily increase a voltage (e.g., a pulsed voltage) across the power distribution network 106 one or more times, each time to a level higher than the previous one (e.g., above a nominal value). Thus, the loads 108 may connect in cascade to the power distribution network 106 by applying a pulsed voltage. Based on a voltage across the power distribution network 106 decreasing below a nominal value, the inverter 102 may stop connecting the loads 108 (e.g., stop the pulsed voltage) to the power distribution network 106 or break connections of the loads 108 from the power distribution network 106. Connecting the loads 108 in cascade may have an advantage that the loads 108 that are not already connected to the power distribution network 106 may not connect if there is insufficient power.

A frequency connect threshold may define a frequency at which the load connector 104 may connect the load 108 to the power distribution network 106 (e.g., based on the load 108 being disconnected from the power distribution network 106). The frequency connect threshold may be a single threshold for all the load connectors 104. One of the load connectors 104, or a group of the load connectors 104, may be associated with a corresponding frequency connect threshold. The inverter 102 may temporarily change (e.g., increase or decrease) a frequency of the power (e.g., 50 Hertz, 60 Hertz) in the power distribution network 106. The load connectors 104 may sense the frequency across the power distribution network 106. Based on the frequency being above or below a corresponding frequency connect threshold, the connector controller 120 may control the switch 118 to connect the load 108 to the power distribution network 106. If the connect parameters include a frequency connect range, the ranges of the loads 108 may not overlap, thus, reducing a probability of altering a load connection order (e.g., which may be based on user priorities). The connector controller 120 may determine or adjust the frequency connect threshold within the frequency connect ranges.

The inverter 102 may iteratively connect the loads 108 to the power distribution network 106. If each load connector 104 is associated with a corresponding frequency connect threshold, the inverter 102 may temporarily change a frequency across the power distribution network 106 one or more times, each time to a level different than the previous one. Thus, the loads 108 may connect in cascade to the power distribution network 106. Based on the voltage across the power distribution network 106 decreasing below a nominal value, the inverter 102 may stop connecting the loads 108 to the power distribution network 106. Regulating connections of the loads 108 to the power distribution network 106 based on the voltage may be advantageous because sensing the voltage may be faster than sensing the frequency (e.g., ¼ cycle to sense the voltage versus ½ cycle to sense the frequency).

The connect parameters may be a combination of voltage and frequency. The load connector 104 may be associated with a corresponding pair of voltage and frequency connect thresholds (e.g., [234V, 52 Hz], or [236V, 48 Hz]). Thus, if multiple loads are used, a resolution between connect thresholds (e.g., between voltage connect thresholds, or between frequency connect thresholds) may be reduced, or a number of the loads 108 may be increased for a given resolution. The system 100 may include more than one central controller 136 (e.g., multiple inverters) providing power to the power distribution network 106. To connect the loads 108 to the power distribution network 106 by increasing a voltage or a frequency of an AC power, the inverters providing power to the power distribution network 106 may synchronize the increasing of the voltage or the increasing of the frequency.

The inverter 102 may determine to connect the loads 108 based on available input power thereto, compared to output power therefrom. For example, based on the available input power being larger than the output power, the inverter 102 may determine to connect one or more of the loads 108. A nominal value of a voltage across the power distribution network 106 may depend on grid ratings. For example, in Europe a nominal value of a voltage across the power distribution network 106 may be 220V, 230V, or 240V RMS. For example, in North America, a nominal value of a voltage across the power distribution network 106 may be 110V, 115V, or 120V RMS.

FIG. 1C shows examples of four thresholds and four ranges. The thresholds and ranges may be either voltage disconnect thresholds, voltage disconnect ranges, or both. In the example of FIG. 1C, LOAD #1 is associated with THRESHOLD #1 and RANGE #1. LOAD #2 is associated with THRESHOLD #2 and RANGE #2, LOAD #3 is associated with THRESHOLD #3 and RANGE #3, and LOAD #4 is associated with THRESHOLD #4 and RANGE #4. For examples, LOAD #1 may be an air conditioner, LOAD #2 may be a boiler, LOAD #3 may be a refrigerator, and LOAD #4 may be a life support system.

In the example of FIG. 1C, THRESHOLD #1 may be a voltage disconnect threshold of 225V and RANGE #1 may be ±2.5V. THRESHOLD #2 may be a voltage disconnect threshold of 217.5V and RANGE #1 may be −2.5V, +5V. THRESHOLD #3 may be a voltage disconnect threshold of 212.5V and RANGE #3 may be ±2.5V. THRESHOLD #4 may be a voltage disconnect threshold of 205V and RANGE #4 may be 200V-207.5V. A load connector corresponding to LOAD #1 (e.g., the load connector 104-1) may adjust THRESHOLD #1 within RANGE #1. Similarly, a load connector corresponding to LOAD #2 may adjust THRESHOLD #2 within RANGE #2, a load connector corresponding to LOAD #3 may adjust THRESHOLD #3 within RANGE #3, and a load connector corresponding to LOAD #4 may adjust THRESHOLD #4 within RANGE #4.

For example, the load connection parameters may be determined for the load connectors 104. The load connection parameters may be determined periodically. The load connection parameters may be determined if the user priority changes, or if the loads 108 are replaced, added or removed from the system 100.

Figure 2A:
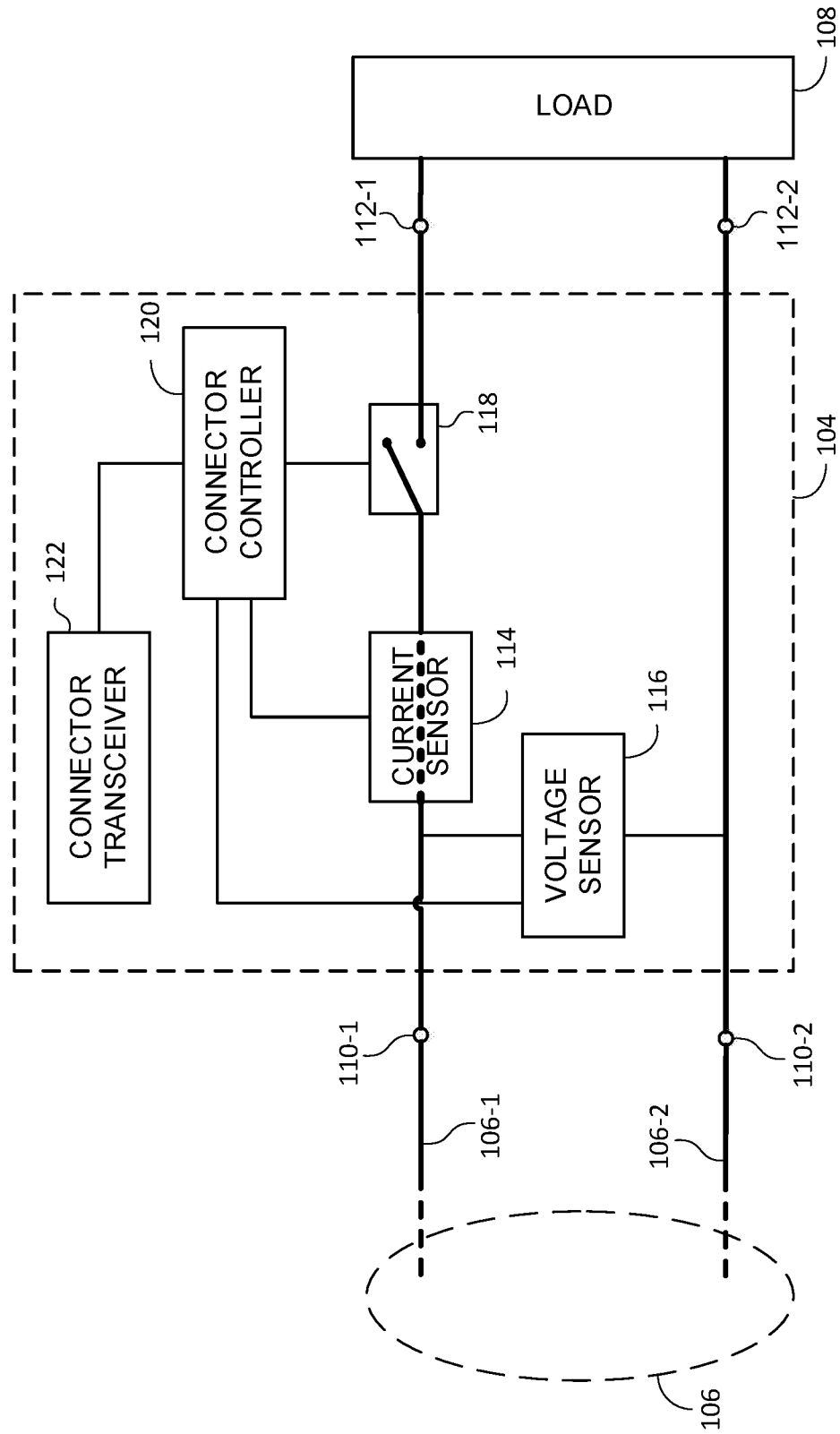
FIGS. 2A-2D show examples of a load connector.

FIGS. 2A-2D show examples of the load connector 104. In FIG. 2A, the load connector 104 may include the input terminal 110-1, the input terminal 110-2, the output terminal 112-1, and the output terminal 112-2. The load connector 104 may also include the switch 118, the connector controller 120, and the connector transceiver 122. The load connector 104 may also include a voltage sensor 116 and a current sensor 114.

The switch 118 may be connected between the input terminal 110-1 and the output terminal 112-1, or between the input terminal 110-2 and the output terminal 112-2. In FIG. 2A, the switch 118 may be connected between the input terminal 110-1 and the output terminal 112-1. The voltage sensor 116 may be connected between the input terminal 110-1 and 110-2 and may be configured to measure a voltage across the input terminal 110-1 and the input terminal 110-2. The current sensor 114 may be connected to either the input terminal 110-1 or the input terminal 110-2 and may be configured measure to the current through one of the input terminal 110-1 and the input terminal 110-2 respectively. In FIG. 2A, the current sensor 114 may be connected to the input terminal 110-1. The connector controller 120 may be connected to the switch 118, the connector transceiver 122, and the voltage sensor 116. The connector controller 120 may further be connected to the current sensor 114.

The connector transceiver 122 may receive a signal relating to load connection parameters, and provide a signal relating to the load connection parameters to the connector controller 120. The connector controller 120 may determine a voltage disconnect threshold from the received signal. The connector controller 120 may adjust a voltage disconnect threshold based on a voltage disconnect range, and may further adjust the voltage disconnect threshold based on the power consumption of the load 108. The connector controller 120 may determine a voltage connect threshold from the received signal. The connector controller 120 may adjust the voltage connect threshold based on a voltage connect range, and may further adjust the voltage connect threshold based on the power consumption of the load 108. The power consumption of the load 108 may be determined based on measurements from the voltage sensor 116 and the current sensor 114. The power consumption of the load 108 may be determined based on a measurement from the voltage sensor 116, the current sensor 114, or the impedance of the load 108.

The voltage sensor 116 may measure a voltage across the input terminals 110-1 and 110-2 and provide this voltage measurement to the connector controller 120. The current sensor 114 may measure the current through the input terminal 110-1 and provide this current measurement to the connector controller 120. The connector controller 120 may control the switch 118 between an on-state (e.g., the switch 118 may be conductive) and an off-state (e.g., switch 118 may not be conductive) based on the voltage across the input terminals 110-1 and 110-2 decreasing below the voltage disconnect threshold (e.g., if load connection parameters include a voltage disconnect threshold). In the off-state of the switch 118, the output terminal 112-1 may be electrically disconnected from the input terminal 110-1 (e.g., little to no current flows between the input terminal 110-1 and the output terminal 112-1). Thus, the load 108 may be disconnected from the input terminal 110-1 and the power line 106-1. The connector controller 120 may set the corresponding voltage disconnect threshold to be within a voltage disconnect range (e.g., if the load connection parameters include the voltage disconnect range).

The connector controller 120 may control the switch 118 to transition from the off-state to the on-state based on the voltage across the input terminals 110-1 and 110-2 increasing above a voltage connect threshold (e.g., if load connection parameters include a voltage connect threshold). In the on-state of the switch 118, the output terminal 112-1 may be electrically connected to the input terminal 110-1 (e.g., current flows between the input terminal 110-1 and the output terminal 112-1). Thus, the load 108 may be connected to the input terminal 110-1 and the power line 106-1. The connector controller 120 may set the corresponding voltage connect threshold to be within a voltage connect range (e.g., if the load connection parameters include the voltage connect range).

Figure 2B:
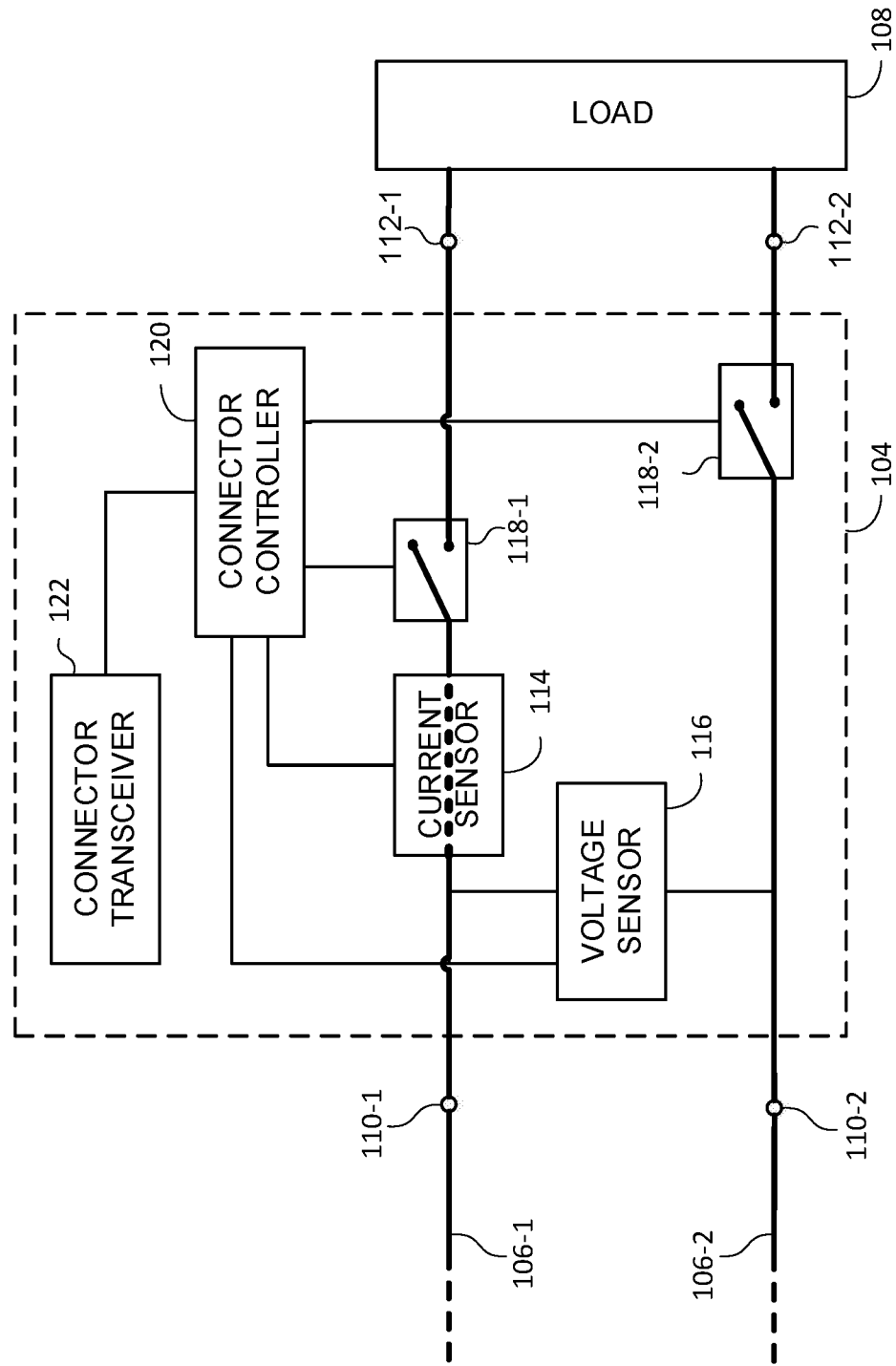

In FIG. 2B, the load connector 104 may include two of the switches 118-1 and 118-2. The switch 118-1 may be connected between the input terminal 110-1 and the output terminal 112-1. The switch 118-1 may be connected between the input terminal 110-2 and the output terminal 112-2. The connector controller 120 may control the switch 118-1, the switch 118-2, or both (e.g., switching between an on-state and an off-state). Using two switches instead of one (e.g., FIG. 2A) may provide redundancy for more reliable operations (e.g., if one of switch 118-1 or 118-2 shorts). The switches 118-1 and 118-2 may be implemented as two separate switches, each controlled separately by the connector controller 120. The switches 118-1 and 118-2 may be implemented as a double-pole double-throw (DPDT) switch, controlled by the connector controller 120.

Figure 2C:
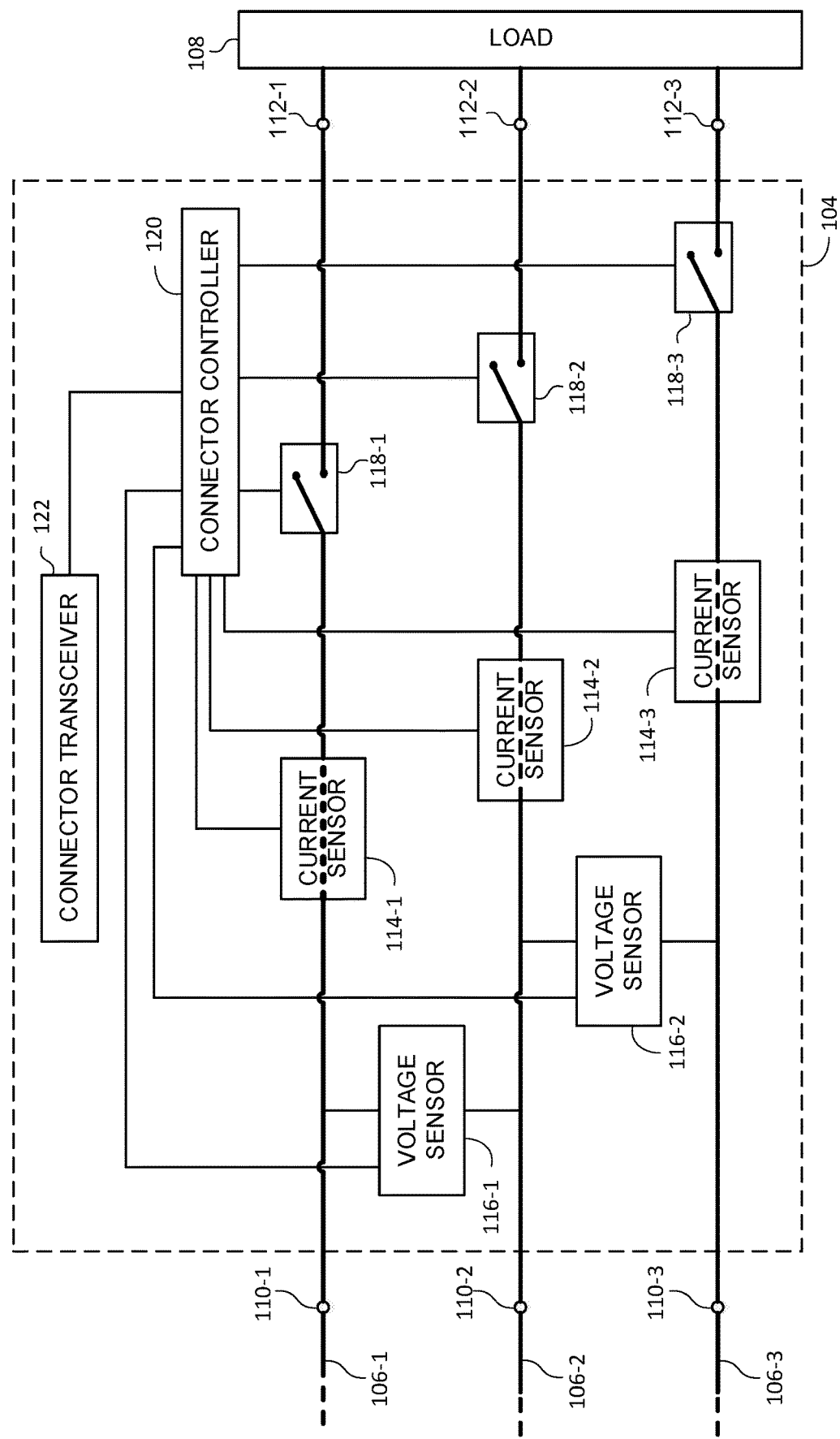

The power distribution network 106 of FIG. 2C may be a three phase network and may include three power lines (e.g., in a Δ configuration), 106-1, 106-2, and 106-3. In FIG. 2C, the load connector 104 may include three of the input terminals 110-1, 110-2, and 110-3 and three of the output terminals 112-1, 112-2 and 112-3, the connector controller 120, and the connector transceiver 122. The load connector 104 may further include three of the switches 118-1, 118-2, and 118-3, and one or more of the voltage sensors 116-1 or 116-2 (collectively or generically, voltage sensors 116). The load connector 104 may include one or more of the current sensors 114-1, 114-2, or 114-3 (collectively or generically, current sensors 114). The switches 118-1, 118-2, and 118-3 may be implemented as three separate switches, each controlled by the connector controller 120. The switches 118-1, 118-2, and 118-3 may be implemented as a triple-pole triple-throw switch, controlled by the connector controller 120.

The switch 118-1 may be connected between the input terminal 110-1 and the output terminal 112-1. The switch 118-2 may be connected between the input terminal 110-2 and the output terminal 112-2. The switch 118-3 may be connected between the input terminal 110-3 and the output terminal 112-2. The voltage sensor 116-1 may be connected between the input terminals 110-1 and 110-2 and may be configured to measure a voltage across the input terminal 110-1 and the input terminal 110-2. The voltage sensor 116-2 may be connected between the input terminals 110-2 and 110-3 and may be configured to measure a voltage across the input terminal 110-2 and the input terminal 110-3. The current sensor 114-1 may be connected to the input terminal 110-1 and may be configured to measure the current through the input terminal 110-1. The current sensor 114-2 may be connected to the input terminal 110-2 and may be configured to measure a current through the input terminal 110-2. The current sensor 114-3 may be connected to the input terminal 110-3 and may be configured to measure a current through the input terminal 110-3. In FIG. 2C, the connector controller 120 may be connected to the switches 118-1, 118-2, and 118-3, and to the connector transceiver 122. The connector controller 120 may be connected to the current sensors 114-1, 114-2, and 114-3. The connector controller 120 may be connected to the voltage sensors 116-1 and 116-2.

The connector controller 120 may control the switches 118-1, 118-2, or 118-3 to transition from an on-state to an off-state, or vice versa (e.g., FIGS. 1, 2A, and 2B). For example, based on the voltage sensor 116-1 or the voltage sensor 116-2 measuring a voltage below a voltage disconnect threshold, the connector controller 120 may control the switches 118-1, 118-2, and 118-3 to transition to the off-state (e.g., if the switches 118-1, 118-2, and 118-3 are in the on-state). For example, based on the voltage sensor 116-1 or the voltage sensor 116-2 measuring a voltage above a voltage connect threshold, the connector controller 120 may control the switches 118-1, 118-2, and 118-3 to transition to the on-state (e.g., if the switches 118-1, 118-2, and the 118-3 are in the off-state). For examples, the connector controller 120 may determine the voltage across the input terminals 110 based on a measurement or measurements of a current through one or more of the input terminals 110 and the impedance of the load 108. The connector controller 120 may use measured voltage and current to determine the power consumption of the load 108. The connector controller 120 may use measured voltage or current, and the impedance of the load 108 to determine the power consumption of the load 108.

Figure 2D:
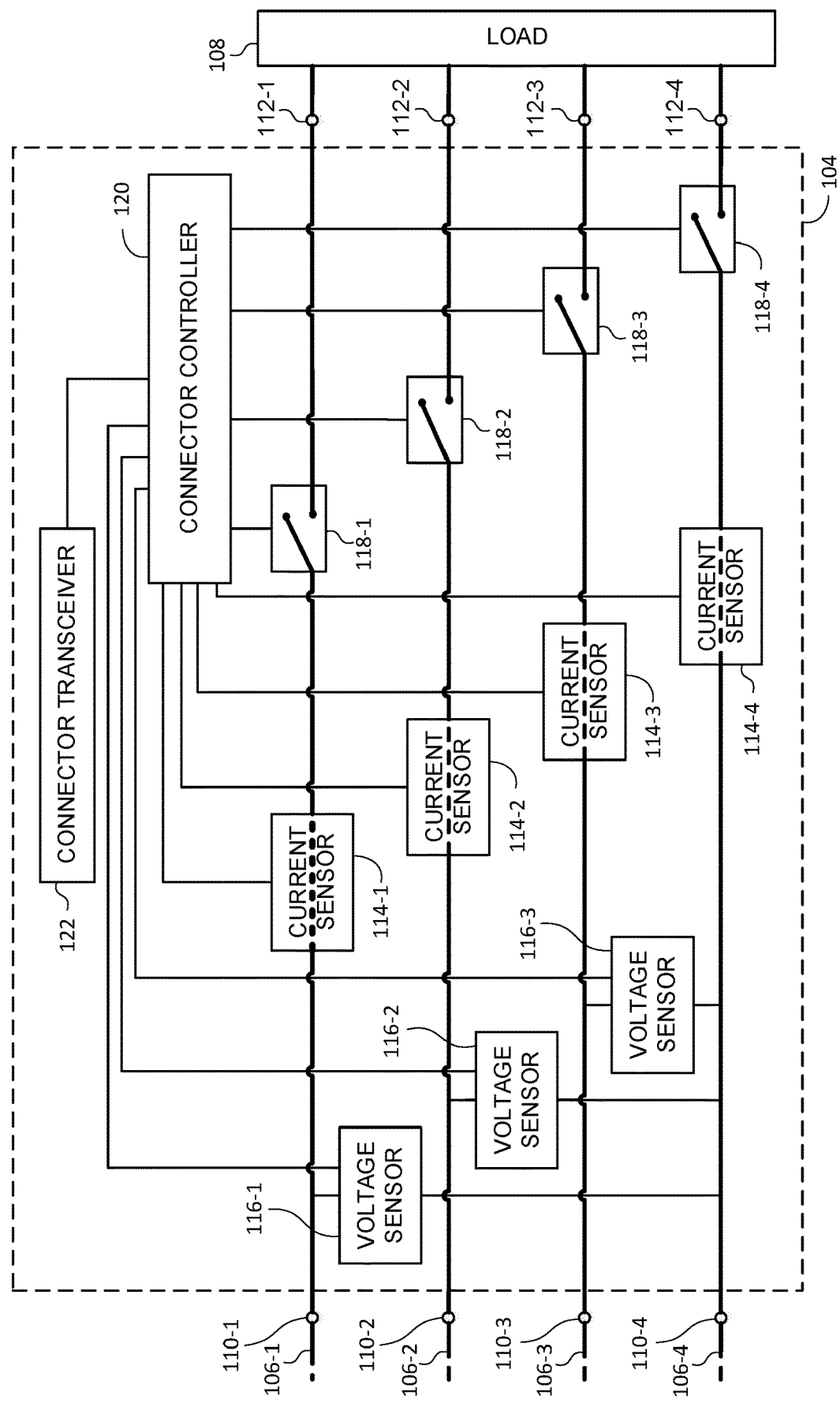

For example, a three phase network may include four power lines (e.g., in a Y configuration which may include three power lines for three phases and one power line for a neutral). In FIG. 2D, the load connector 104 may include four input terminals 110-1, 110-2, 110-3, and 110-4, each may be connected to a corresponding power line, 106-1, 106-2, 106-3, and 106-4. Each of the power lines 106-1, 106-2, and 106-3 may correspond to a respective phase of the three phases, and the power line 106-4 may correspond to a neutral. The load connector 104 of FIG. 2D may include four output terminals 112-1, 112-2, 112-3, and 112-4, the connector controller 120, and the connector transceiver 122. The load connector 104 may further include at least three switches 118-1, 118-2, and 118-3. The load connector 104 may include a fourth switch 118-4. The load connector 104 may include at least three current sensors 114-1, 114-2, and 114-3. The load connector 104 may include a fourth current sensor 114-4. The load connector 104 may include three voltage sensors 116-1, 116-2, and 116-3. The switches 118-1, 118-2, 118-3, and 118-4 may be implemented as four separate switches, each controlled by the connector controller 120. The switches 118-1, 118-2, 118-3, and 118-4 may be implemented as a quadruple-pole quadruple-throw switch, controlled by the connector controller 120.

The switch 118-1 may be connected between the input terminal 110-1 and the output terminal 112-1. The switch 118-2 may be connected between the input terminal 110-2 and the output terminal 112-2. The switch 118-3 may be connected between the input terminal 110-3 and the output terminal 112-2. The switch 118-4 may be connected between the input terminal 110-3 and the output terminal 112-2. If the load connector 104 does not include the switch 118-4, the input terminal 110-4 may be connected directly to the output terminal 112-4. The voltage sensor 116-1 may be connected between the input terminals 110-1 and 110-4 and may be configured to measure a voltage across the input terminal 110-1 and the input terminal 110-4 (e.g., between a first phase and a neutral). The voltage sensor 116-2 may be connected across the input terminals 110-2 and 110-4 and may be configured to measure a voltage across the input terminal 110-2 and the input terminal 110-4 (e.g., between a second phase and a neutral). The voltage sensor 116-3 may be connected between the input terminals 110-3 and 110-4 and may be configured to measure a voltage across the input terminal 110-3 and the input terminal 110-4 (e.g., between a third phase and a neutral). The current sensor 114-1 may be connected to the input terminal 110-1 and may be configured to measure a current through the input terminal 110-1. The current sensor 114-2 may be connected to the input terminal 110-2 and may be configured to measure a current through the input terminal 110-2. The current sensor 114-3 may be connected to the input terminal 110-3 and may be configured to measure a current through the input terminal 110-3. If the load connector 104 includes the current sensor 114-4, the current sensor 114-4 may be connected to the input terminal 110-4 and may be configured to measure a current through the input terminal 110-4. In FIG. 2D, the connector controller 120 may be connected to the switches 118-1, 118-2, 118-3, 118-4, and to the connector transceiver 122. The connector controller 120 may further be connected to the current sensors 114-1, 114-2, 114-3, and 114-4. The connector controller 120 may further be connected to the voltage sensors 116-1 and 116-2.

The connector controller 120 may control the switches 118-1, 118-2, 118-3, or 118-4 to be between an on-state and an off-state. For example, based on the voltage sensors 116-1116-2 or 116-3, measuring a voltage below a voltage disconnect threshold, the connector controller 120 may control the switches 118-1, 118-2, 118-3, or 118-4 to transition to the off-state (e.g., if the switches 118-1, 118-2, 118-3, or 118-4 are in the on-state). For example, based on the voltage sensors 116-1, 116-2, or 116-3 measuring a voltage above a voltage connect threshold, the connector controller 120 may control the switches 118-1, 118-2, 118-3, or 118-4 to transition to the on-state (e.g., if the switches 118-1, 118-2, 118-3, or 118-4 are in the off-state).

The switch(es) 118 of FIG. 1A, 1B, or 2A-2D may be implemented as solid state switches (e.g., transistors) or as electromechanical switches (e.g., relays). The voltage sensors 116 described herein may be configured to measure a voltage across corresponding power lines of the power distribution network 106, and produce a measurement of the voltage for the connector controller 120. The voltage sensors 116 may be based on a resistive or capacitive divider, a resistive or capacitive bridge, comparators (e.g., using operational amplifiers), or the like. If the power distribution network 106 distributes AC power, the voltage sensors 116 may be an RMS voltage sensors measuring an RMS value of a voltage across the power distribution network 106. For example, an RMS voltage sensor may be based a multiplier circuit (e.g., op-Amp based multiplier circuit, gilbert cell), and an integration circuit. For example, using the multiplier circuit to square a measured voltage, an integrator to sum results from the multiplier circuit, followed by a square root circuit (e.g., by feeding a squarer circuit in a negative feedback of an op-Amp), may output the RMS value of the input voltage. The connector controller 120 may be configured to continuously calculate the RMS value of the voltage across the power distribution network 106. For example, the connector controller 120 may be configured to implement a filter (e.g., which implements a transfer function) over samples of instantaneous voltage measurements, for calculating the RMS value of the voltage across the power distribution network 106. The voltage sensors 116 may be instantaneous voltage sensors measuring a voltage across the power distribution network 106. The connector controller 120 may be configured to determine the maximum voltage (e.g., peak voltage) across the power distribution network 106 by using the samples of instantaneous voltage measurements. The current sensors 114 may be configured to measure currents through a corresponding input terminal 110, and produce a measurement of the respective current for the connector controller 120. The current sensors 114 may comprise a Current Transformer (CT) sensor, Hall effect sensor, zero flux sensor, or the like.

According to aspects of the disclosure herein, in case voltage sensors 116 measure instantaneous voltage, connector controller 120 may receive, from voltage sensors 116, voltage measurements relating to the voltage across power distribution network 106. Based on a measurement having a value satisfying the voltage disconnect threshold (e.g., a value below or above the voltage disconnect threshold), connector controller 120 may activate a timer (e.g., which may be implemented by a counter). In case the voltage does not exceed the voltage disconnect threshold (e.g., rise above or drop below the voltage disconnect threshold) within a first predetermined time period, connector controller 120 may activate the corresponding switch 118, to disconnect the load connector 104 from power distribution network 106. The first predetermined time period may be based on a frequency of a power waveform in power distribution network 106 and the determined voltage disconnect threshold. Similarly, based on a measurement having a value satisfying a voltage connect threshold (e.g., a value above or below the voltage connect threshold), connector controller 120 may activate a timer (e.g., which may be implemented by a counter). In case the voltage does not exceed the voltage connect threshold (e.g., drop below or rise above the voltage connect threshold) within a second predetermined time period, connector controller 120 may activate the corresponding switch 118, to connect the load connector 104 to power distribution network 106.

According to aspects of the disclosure herein, load connectors 104 may have a second threshold, common to all load connectors 104. Based on a measurement having a value satisfying the common threshold (e.g., a value below or above the common threshold), each of connector controllers 120 may activate a timer. In case the voltage does not exceed the common threshold (e.g., rise above or drop below the common threshold) within a third predetermined time period (e.g., which may be longer than the first predetermined time period), connector controllers 120 may activate the corresponding switches 118, to disconnect from power distribution network 106, all load controllers 104 which may still be connected to power distribution network 106.

The load connector 104 may be enclosed in a casing designed to be placed on a surface of a premises (e.g., a wall, ceiling, floor, table, countertop, etc.). The input terminals 110 may be connected to the power lines of the power distribution network 106 that may be on or in a surface that the load connector 104 is placed on. The load connector 104 may also be designed to connect to existing electrical outlets in a premises by designing the input terminals 110 as a power plug that may be plugged to the existing electrical outlets. A load connector, such as the load connector 104, may be connected to more than one load. A load connector, such as the load connector 104, may be designed to be located at an electrical panel of the user premise (e.g., at an electrical panel of a home). For example, the load connector 104 may be connected in series with a circuit breaker of the corresponding load or loads 108 of the load connector 104, or may be integrated with the circuit breaker. For example, the load connector 104 may replace a circuit breaker in the electrical panel.

The load connector 104 may be integrated within loads such as the loads 108. For example, some loads 108 may comprise an internal controller, one or more sensors, and circuits such as rectifiers, converters, or inverters, which may comprise one or more switches. For example, a water boiler may comprise a rectifier or a converter, which may include internal switch(es) and an internal controller. The internal controller may connect the load 108 to the power distribution network 106 or disconnect the load 108 from the power distribution network 106 using the internal switches within the load 108. For example, the internal controller may control the switches of the rectifier, converter, or inverter in the load 108 to disconnect the load 108 from the power distribution network 106, connect the load 108 to the power distribution network 106, or control the power dissipation of the load 108. The internal controller of the load connector 104, which includes rectifiers, converters or inverters, may control the power dissipation of the load 108 based on a determination that a voltage across the power distribution network 106 reduces. For example, the internal controller of the load connector 104 may control the rectifier, converter, or inverter to reduce current drawn from the power distribution network 106, or stop drawing current from the power distribution network 106. The load 108 may be an energy storage device (e.g., battery, supercapacitor, flywheel), and the load connector 104 may be a storage interface device configured to charge or discharge the energy storage device.

Figure 3:
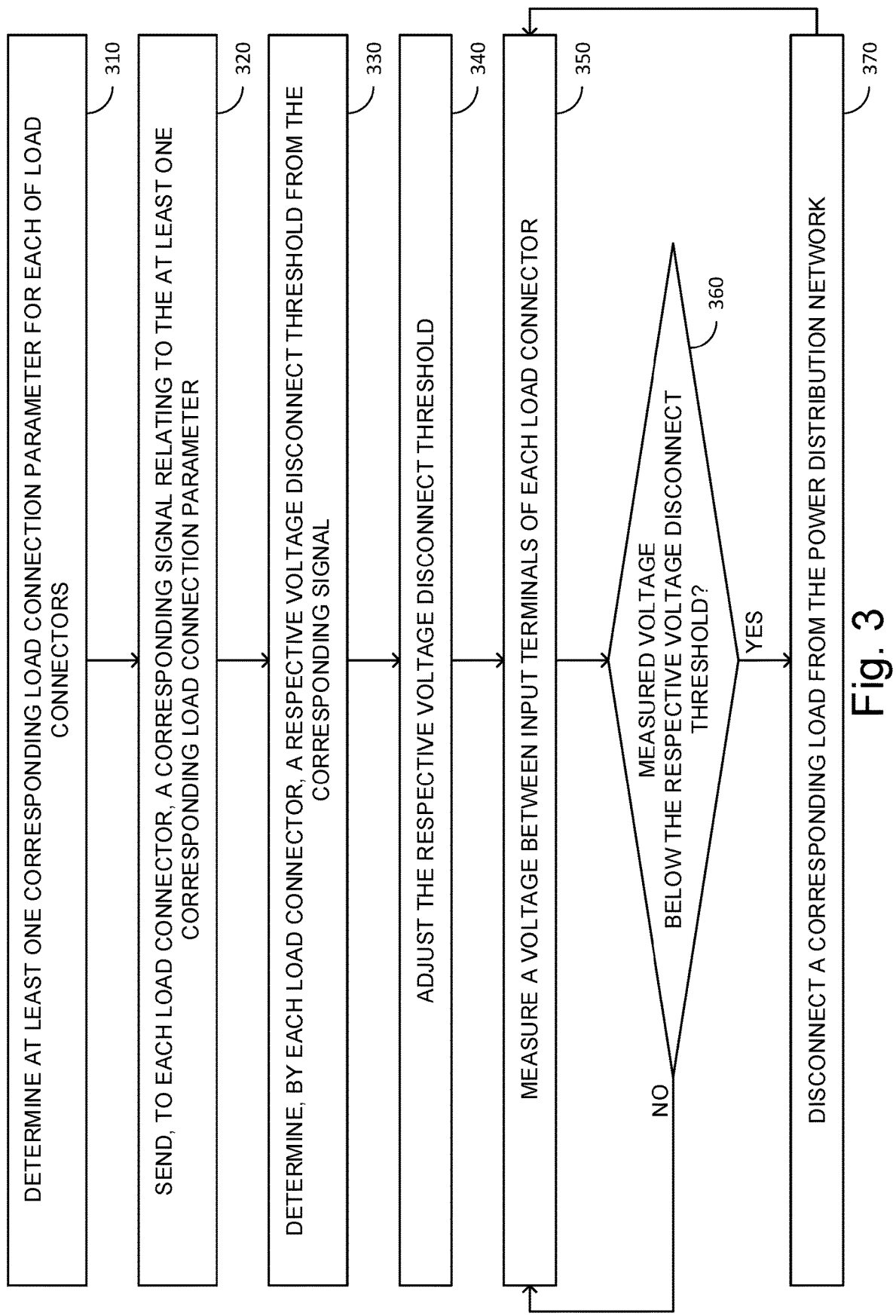
FIG. 3 shows an example of a method for regulating connections of loads to a power distribution network based on load connection parameters.

FIG. 3 shows an example of a method for regulating connections of the loads 108 to the power distribution network 106, in which one or more load connection parameters may include a voltage disconnect parameter. In step 310, at least one corresponding load connection parameter may be determined for each of the load connectors 104. The at least one corresponding load connection parameter may include one or more voltage disconnect parameters. The one or more voltage disconnect parameters may include a voltage disconnect threshold, a voltage disconnect range, or a voltage disconnect function. The at least one corresponding load connection parameter may be determined based on a user defined priority, a power rating of a respective load 108, or based on a combination of the user defined priority and the power rating of the respective load 108. Prioritizing the one or more voltage disconnect parameters may result in disconnecting the loads 108-1, 108-2, . . . , and 108-N in cascade (e.g., one at a time). In FIG. 1A or 1B, the central controller 136 may determine at least one corresponding load connection parameter for each of the load connectors 104-1, 104-2, . . . 104-N.

In step 320, a corresponding signal relating to the at least one corresponding load connection parameter may be sent to each load connector 104. In FIG. 1A or 1B, the central transceiver 138 may send (e.g., transmit) the corresponding signal to a corresponding connector transceiver 122 of each load connector 104.

In step 330, a respective voltage disconnect threshold may be determined by each load connector 104 from the corresponding signal. In FIG. 1A, 1B, or 2A-2D, the connector controller 120 may determine a respective voltage disconnect threshold, for a corresponding load connector 104, from the corresponding signal received by a corresponding connector transceiver 122.

In step 340, the respective voltage disconnect threshold may be adjusted (e.g., if the one or more load connection parameters include a voltage disconnect range). The respective voltage disconnect threshold may be adjusted to be within a respective voltage disconnect range (e.g., based on a power consumption of a respective load 108). In FIG. 1A, 1B, or 2A-2D, a corresponding connector controller 120 may adjust the respective voltage disconnect threshold. Step 340 is optional.

In step 350, a voltage across input terminals of each load connector 104 may be measured. The voltage may be measured directly between the input terminals of each load connector 104. The voltage may be measured based on a measurement of a current through one of the input terminals of each load connector 104 and the impedance of the respective load 108. In FIG. 2A-2D, the voltage sensor 116 may measure a voltage across the input terminals 110 of the respective load connector 104. The current sensor 114 may measure a current through one of the input terminals 110. The corresponding connector controller 120 may determine the voltage across the input terminals 110 based on the measured current and the impedance of the respective load 108.

In step 360, a level of the measured voltage, relative to the respective voltage disconnect threshold, may be determined. If the measured voltage is below the respective voltage disconnect threshold, the method may proceed to step 370. If the measured voltage is above the respective voltage disconnect threshold, the method may return to step 350. In FIG. 1A, 1B or 2A-2D, the corresponding connector controller 120 may determine the level of the measured voltage, relative to the respective voltage disconnect threshold.

In step 370, the respective load 108 may be disconnected from the power distribution network 106. In FIG. 1A, 1B, or 2A-2D, the corresponding connector controller 120 may control the switch 118 to transition to the off-state thereof, thereby disconnecting the respective load 108 from the power distribution network 106. After step 370, the method may return to step 350.

Figure 4:
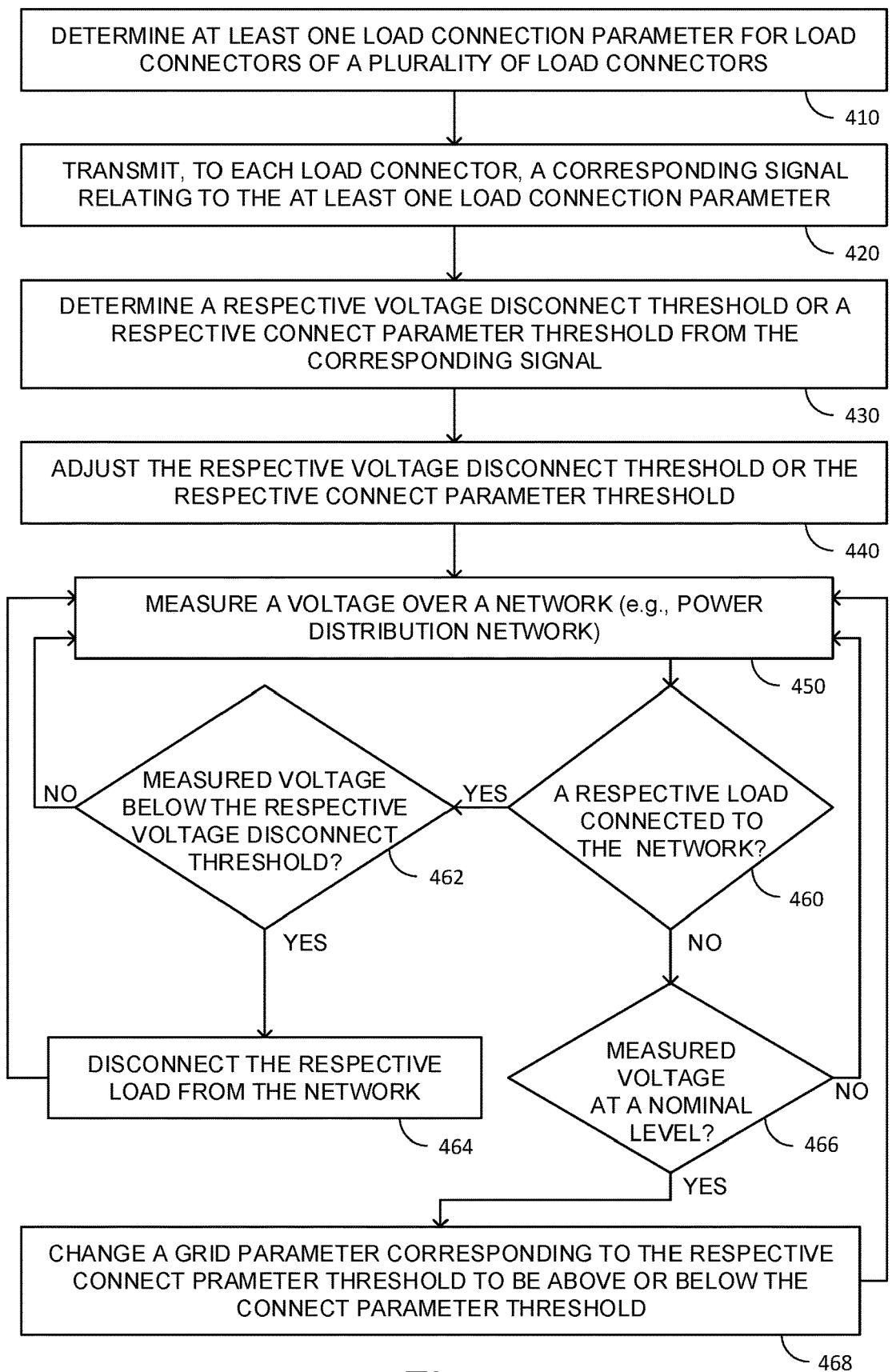
FIG. 4 shows an example of a method for regulating connections of loads to a power distribution network based on load connection parameters including voltage disconnect parameters or voltage connect parameters.

FIG. 4 shows an example of a method for regulating connections of the loads 108 to the power distribution network 106, in which the load connection parameters may include voltage disconnect parameters or voltage connect parameters. In step 410, at least one load connection parameter may be determined for load connectors of a plurality of the load connectors 104. The at least one load connection parameter may include one or more voltage disconnect parameters, or one or more connection parameters. The one or more voltage disconnect parameters may include a voltage disconnect threshold, a voltage disconnect range, or a voltage disconnect function. The one or more connect parameters may include a voltage connect threshold, a frequency connect range, a voltage connect range, a frequency connect range, or a voltage connect function. The at least one load connection parameter of the plurality of the load connectors 104 may be determined based on a user defined priority, power ratings of the loads 108 or based on a combination of the user defined priority and the power ratings of the loads 108. Prioritizing one or more load connection parameters may result in disconnecting or connecting the loads 108 in cascade (e.g., one at a time). In FIG. 1A or 1B, the central controller 136 may determine at least one corresponding load connection parameter for each of the load connectors 104-1, 104-2, . . . , 104-N.

In step 420, a corresponding signal relating to the at least one load connection parameter may be sent to each load connector 104. In FIG. 1A, 1B, or 2A-2D, the central transceiver 158 may send the corresponding signal to a corresponding connector transceiver 122 of each load connector 104.

In step 430, a respective voltage disconnect threshold or a respective connect parameter threshold may be determined from the corresponding signal. The respective connect parameter threshold may be a voltage connect threshold or a frequency connect threshold. In FIG. 1A, 1B, or 2A-2D, a corresponding connector controller 120 may determine a respective voltage disconnect threshold or a respective connect parameter threshold for a corresponding load connector 104, from the corresponding signal received by a corresponding connector transceiver 122.

In step 440, the respective voltage disconnect threshold or the respective connect parameter threshold may be adjusted (e.g., if the one or more load connection parameters include a voltage disconnect range or a connect parameter range). The respective voltage disconnect threshold may be adjusted to be within a respective voltage disconnect range (e.g., based on a power consumption of a respective load 108). The respective connect parameter threshold may be adjusted to be within a respective connect parameter range. In FIG. 1A, 1B, or 2A-2D, the corresponding connector controller 120 may adjust the respective voltage disconnect threshold or the respective connect parameter threshold. Step 430 is optional.

In step 450, a voltage over a network may be measured. For example, the voltage across the power distribution network 106 may be measured between the input terminals of each load connector 104. The voltage may be measured based on a measurement of a current through one of the input terminals of each load connector 104 and the impedance of the respective load 108. In FIGS. 2A-2D, the voltage sensor 116 may measure a voltage across the power line 106-1 and the power line 106-2 of the power distribution network 106, by measuring a voltage across the input terminals 110 of the respective load connector 104. In FIGS. 2A-2D, the current sensor 114 may measure a current through one of the input terminals 110. The corresponding connector controller 120 may determine the voltage across the input terminals 110 based on the measured current and the impedance of the respective load 108. In FIG. 1B, a voltage sensor in the inverter 102 (e.g., an output voltage sensor 210 of an inverter 200 shown in FIG. 5) may measure the voltage cross the power line 106-1 and the power line 106-2 of the power distribution network 106.

In step 460, a connection status of the respective load 108 to the power distribution network 106 may be determined. If the respective load 108 is connected to the power distribution network 106, the method proceeds to step 462. If the respective load 108 is not connected to the power distribution network 106, the method proceeds to step 466. In FIG. 1A, 1B, or 2A-2D, the corresponding connector controller 120 may determine the connection status of the respective load 108 to the power distribution network 106. For example, the corresponding connector controller 120 may determine a state of the switch 118. If the switch 118 is in the on-state, the corresponding connector controller 120 may determine that the respective load 108 is connected to the power distribution network 106. If the switch 118 is in the off-state, the corresponding connector controller 120 may determine that the respective load 108 is disconnected from the power distribution network 106.

In step 462, a level of the measured voltage, relative to the respective voltage disconnect threshold, may be determined. If the measured voltage is below the respective voltage disconnect threshold, the method proceeds to step 464. If the measured voltage is above the respective voltage disconnect threshold, the method returns to step 450. In FIG. 1A, 1B, or 2A-2D, the corresponding connector controller 120 may determine the level of the measured voltage relative to the respective voltage disconnect threshold.

In step 464, the respective load 108 may be disconnected from the power distribution network 106. In FIG. 1A, 1B, or 2A-2D, the corresponding connector controller 120 may control the switch 118 to transition to the off-state thereof, thereby disconnecting the respective load 108 from the power distribution network 106. After step 464, the method may return to step 450.

In step 466, level of the measured voltage, relative to a nominal level, may be determined. If the measured voltage is at the nominal level, the method may proceed to step 468. If the measured voltage is below or above the nominal level, the method may return to step 450. In FIG. 1A, 1B, or 2A-2D, the connector controller 120 may determine the level of the measured voltage relative to the nominal level.

In step 468, a grid parameter (e.g., voltage, or frequency) corresponding to the respective connect parameter threshold may be changed to be above or below the connect parameter threshold. For example, if the respective connect parameter threshold is a voltage connect threshold, a voltage of the power distribution network 106 may be increased. If the respective connect parameter threshold is a frequency connect threshold, a voltage of the power distribution network 106 may be either increased or decreased. In FIG. 1B, the inverter 102 may change the grid parameter corresponding to the respective connect parameter threshold.

Figure 5:
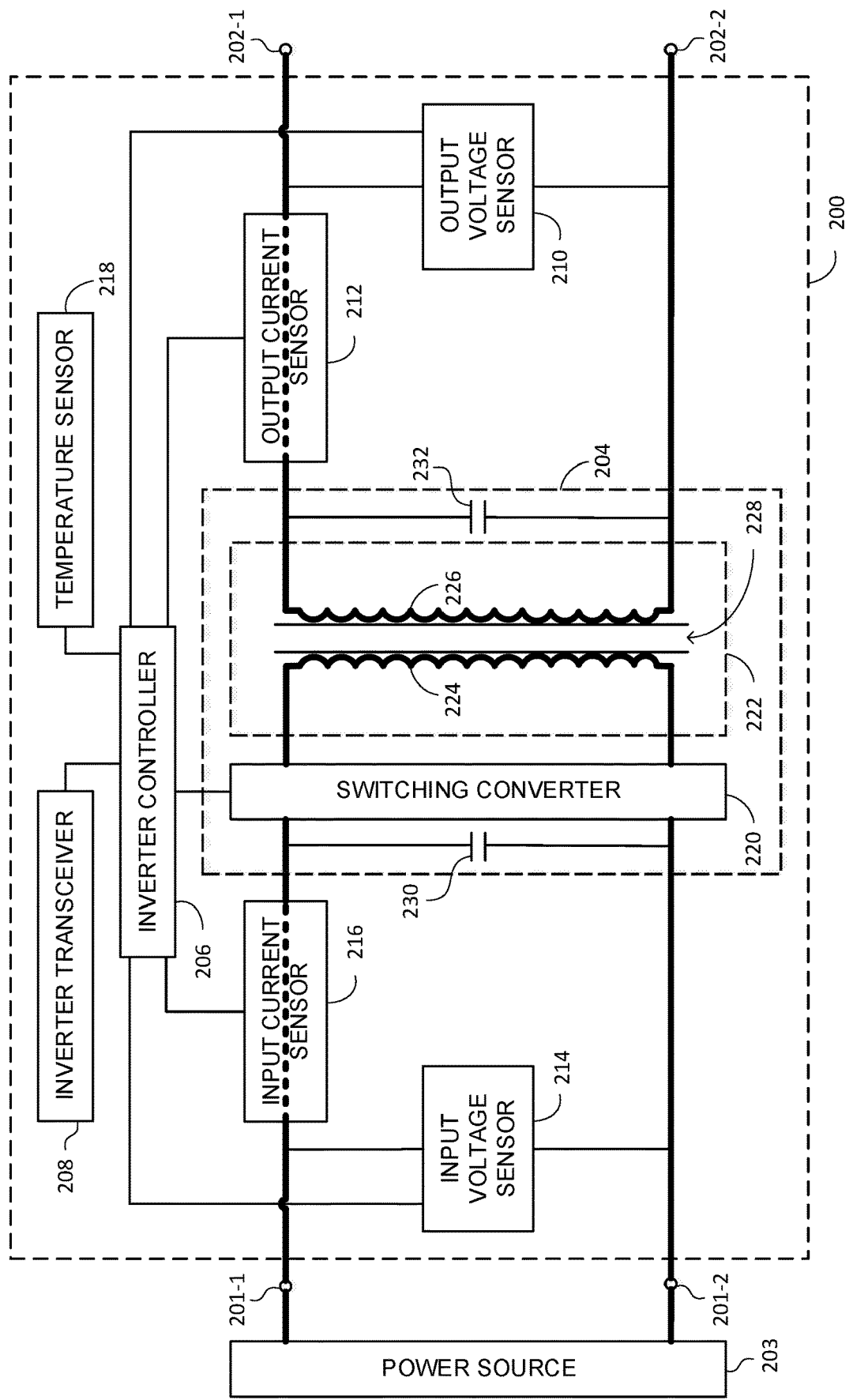
FIG. 5 shows an example of an inverter.

The central circuit 101 may be an inverter configured to convert DC power to AC power. FIG. 5 shows an example of the inverter 200. The inverter 200 is an example of the inverter 102 of FIG. 1A or the central circuit 101 of FIG. 1B. The inverter 200 may include input terminals 201-1 and 201-2 (corresponding to the input terminals 130-1 and 130-2 of FIG. 1B), output terminals 202-1 and 202-2 (corresponding to the output terminals 132-1 and 132-2 of FIG. 1B). The inverter 200 may further include a DC-AC converter 204, an inverter transceiver 208 (corresponding to the central transceiver 138), and an inverter controller 206 (corresponding to the central controller 136). Optionally, the inverter 200 may include one or more sensors such as an input voltage sensor 214, an input current sensor 216, an output voltage sensor 210, an output current sensor 212, and a temperature sensor 218. The DC-AC converter 204 may include at least a switching converter 220 and optionally include a transformer 222. The DC-AC converter 204 may optionally comprise an input capacitor 230 and an output capacitor 232. The transformer 222 may comprise primary windings 224, secondary windings 226, both wound around a common core 228. The common core 228 may comprise one or more ferromagnetic materials.

The input terminals 201-1 and 201-2 may be connected to a power source 203. The power source 203 may be an alternative power source, such as a backup storage device (e.g., a battery, flywheel, capacitor and/or supercapacitor), or a renewable energy source (e.g., a photovoltaic array, a wind turbine, or an array of wind turbines). The power source 203 may be one or more fuel based generators (e.g., a diesel generator), or one or more fuel cells. The inverter controller 206 may be connected to the switching converter 220 and to the inverter transceiver 208. The inverter controller 206 may be further connected to the input voltage sensor 214, the input current sensor 216, the output voltage sensor 210, the output current sensor 212, and the temperature sensor 218. An input of the switching converter 220 may be connected to the input terminals 201-1 and 201-2. An output of the switching converter 220 may be connected to the primary windings 224 of the transformer 222. The secondary windings 226 of the transformer 222 may be connected to the output terminals 202-1 and 202-2 of the inverter 200. The input capacitor 230 may be connected across the input terminals 201-1 and 201-2 and the output capacitor 232 may be connected across the output terminals 202-1 and 202-2. The input voltage sensor 214 may be connected between the input terminals 201-1 and 201-2 and the output voltage sensor 210 may be connected between the output terminals 202-1 and 202-2. For example, the input current sensor 216 may be connected to the input terminal 201-1 and the output current sensor 212 may be connected to the output terminal 202-1.

For example, the transformer 222 may be a step-up transformer in which a number of windings in the secondary windings 226 may be larger than a number of windings in the primary windings 224. The transformer 222 may be a step-down transformer in which a number of windings in the secondary windings 226 may be smaller than a number of windings in the primary windings 224. The transformer 222 may also provide galvanic isolation between the input terminals 201-1 and 201-2 and the output terminals 202-1 and 202-2 of the inverter 200. In addition, one or both of the primary windings 224 and the secondary windings 226 may be encapsulated in a resin such as epoxy (e.g., cast in vacuum to reduce a number of air bubbles). The primary windings 224 and the secondary windings 226 may be wound around the common core 228, which may comprise ferromagnetic materials. In addition, the primary windings 224 and the secondary windings 226 may each comprise bifilar windings, and each wound on a different leg of the common core 228. In operation, if the switching converter 220 is a DC to AC converter, the switching converter 220 may receive a DC voltage at the input terminals 201-1 and 201-2. The input capacitor 230 may stabilize a voltage across the input terminals 201-1 and 201-2. The switching converter 220 may generate a pulsed output at an input of the transformer 222. The transformer 222 may step-up, step-down or maintain a voltage generated by the switching converter 220. The output capacitor 182 may filter an output of the transformer 222 to generate an AC voltage across the output terminals 202-1 and 202-2.

The DC-AC converter 204 may comprise multiple intermediate conversion stages such as DC-DC-AC-DC-AC conversion stages. The first DC-DC conversion stage may increase a DC voltage generated by the power source 203. The next DC-AC conversion stage may convert the DC voltage to a pulsed voltage and may comprise a transformer for stepping up the pulsed voltage, which may be rectified in a next AD-DC conversion stage. The rectified voltage may be converted to a pulsed voltage at a determined frequency (e.g., a grid frequency). Such a multi-stage power conversion may further include filtering between any one of the above described stages. If the inverter 200 receives an AC power at the input terminals 201-1 and 201-2, the DC-AC converter 204 may include a rectification stage. Using multi-stage conversion techniques may aid in reducing a size of magnetic elements (e.g., transformers). For example, a size of the transformer 222 may be reduced by boosting the DC voltage in the first DC-DC conversion stage and switching in the next DC-AC conversion stage at a relatively high frequency (e.g., tens of kilohertz, hundreds of kilohertz or more).

The input voltage sensor 214 and the output voltage sensor 210 may be configured to measure a voltage across the input terminals 201-1 and 201-2 and the output terminals 202-1 and 202-2 respectively, and produce a measurement of the respective input or output voltage for the inverter controller 206. The input voltage sensor 214 and the output voltage sensor 210 may be based on a resistive or capacitive divider, a resistive or capacitive bridge, comparators (e.g., using operational amplifiers), or the like. For example, the input current sensor 216 and the output current sensor 212 may be configured to measure currents through the input terminal 201-1 and the output terminal 202-1 respectively, and produce a measurement of the respective input or output current for the inverter controller 206. The input current sensor 216 and the output current sensor 212 may comprise a Current Transformer (CT) sensor, Hall effect sensor, zero flux sensor, or the like.

The inverter controller 206 may be configured to control the switching converter 220 by controlling switches in the switching converter 220 using a Pulse Width Modulation (PWM) signal. In operation, the switching converter 220 may generate, from a DC voltage across the input terminals 201-1 and 201-2, a pulsed output voltage (e.g., square-wave or a stepped pulsed wave) at the input of the transformer 222. The transformer 222 may step-up, step-down or maintain the pulsed output voltage generated by the switching converter 220. The output capacitor 232 may filter the output of the transformer 222 to generate an AC voltage across the output terminals 202-1 and 202-2.

A system may comprise a plurality of power lines of a power distribution network configured to provide power to at least one load of one or more loads, wherein the at least one load is configured to be connected to the power distribution network via a load connector, and a central controller configured to transmit a signal relating to at least one parameter of the load connector. The load connector may comprises input terminals configured to be connected to the power lines of the power distribution network, output terminals configured to be connected to the at least one load, at least one switch, configured to connect the input terminals to the output terminals or disconnect the input terminals from the output terminals, a connector transceiver configured to receive the signal, a voltage sensor, connected across the input terminals, configured to measure a voltage across the input terminals, and a connector controller, coupled to the connector transceiver, the at least one switch, and the voltage sensor. The connector controller may determine a voltage disconnect threshold for the load connector based on the signal received by the connector transceiver, and control the at least one switch to disconnect the output terminals from the input terminals based on a voltage measured across the input terminals, and the voltage disconnect threshold. The central controller may determine, based on a user defined priority, the at least one parameter. The central controller may determine, based on power ratings of the load, the at least one parameter. The connector controller may be configured to, based on a measured voltage satisfying the voltage disconnect threshold, disconnect the at least one load from the power distribution network. The connector controller may be configured to disconnect the at least one load from the power distribution network based on the measured voltage satisfying the voltage disconnect threshold for at least a predetermined time period. The at least one parameter may comprise at least a voltage disconnect range. The connector controller may be configured to determine the voltage disconnect threshold based on the voltage disconnect range. The at least one parameter may comprise at least a voltage disconnect function. The connector controller may be configured to determine the voltage disconnect threshold based on the voltage disconnect function. The system may further comprise an inverter configured to receive, via input terminals, direct current (DC) voltage, be connected, via output terminals, to the plurality of power lines, and convert the DC at the input terminals to the AC at the output terminals, wherein the central controller may be configured to control the inverter based on a Pulse Width Modulation signal. The input terminals may be configured to be connected to a DC power source. DC power source may be one of a photovoltaic array, at least one battery, or at least one supercapacitor. The system may be configured to operate in an off grid state.

A method may comprise sending, by a central controller and to at least one load connector of a plurality of load connectors, a signal relating to at least one parameter for the at least one load connector, wherein the at least one load connector is connected to a load and to a power distribution network, and causing the at least one load connector to: determine a voltage disconnect threshold from the signal relating to the at least one parameter, measure a voltage at input terminals of the at least one load connector, and disconnect the load from the power distribution network based on the measured voltage and the determined voltage disconnect threshold. The sending the signal may comprise determining the at least one parameter based on a user defined priority. The sending the signal may comprise determining the at least one parameter based on power ratings of the load. The at least one parameter may comprise the voltage disconnect threshold, and wherein the causing of the at least one load connector to disconnect the load from the power distribution network may be based on the measured voltage satisfying the voltage disconnect threshold and the load being connected to the power distribution network. The at least one parameter may comprise a voltage disconnect range, and wherein the causing of the at least one load connector to determine the voltage disconnect threshold may be based on the voltage disconnect range. The method may further comprise adjusting the voltage disconnect threshold based on the voltage disconnect range. The voltage disconnect range may comprise an upper voltage disconnect level and a lower voltage disconnect level. The voltage disconnect range may comprise a positive deviation and a negative deviation from the voltage disconnect threshold of the at least one load connector. The at least one parameter may comprise a voltage disconnect function, and wherein the causing to determine the voltage disconnect threshold may be based on the voltage disconnect function.

One or more features described herein may be implemented in computer-usable data or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. The functionality of the program modules may be combined or distributed. The functionality may be embodied in whole or in part in firmware or hardware equivalents such as integrated circuits, field programmable gate arrays (FPGA), or the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of method(s) described herein. An article of manufacture may comprise a non-transitory tangible computer readable machine-accessible medium having instructions encoded thereon for enabling programmable hardware to cause a device to allow operation of the method(s) described herein. The device, or one or more devices such as in a system, may include one or more processors, memory, interfaces, and/or the like. Any device or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The claims set as filed is repeated herein as clauses in order to preserve all subject matter in the present application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
 a plurality of power lines of a power distribution network of user premises configured to provide power to a plurality of loads located at the user premises, wherein each load is configured to be connected to the power distribution network via a respective load connector; and
 a central controller configured to transmit a signal,
 wherein each load connector comprises:
  input terminals connected to the power lines of the power distribution network;

output terminals connected to a respective load of the plurality of loads;

at least one switch, configured to connect the input terminals to the output terminals and disconnect the input terminals from the output terminals;

a connector transceiver configured to receive the signal;

a voltage sensor, connected across the input terminals, configured to measure a voltage across the input terminals; and a connector controller, coupled to the connector transceiver, the at least one switch, and the voltage sensor, wherein the connector controller is configured to:
determine a respective voltage disconnect threshold for the load connector based on the signal received by the connector transceiver, and
control the at least one switch to disconnect the output terminals from the input terminals based on:
a voltage measured across the input terminals; and
the voltage disconnect threshold.

2. The system according to claim 1, wherein the signal is based on a user defined priority.

3. The system according to claim 1, wherein the signal is based on power ratings of the respective load.

4. The system according to claim 1, wherein the connector controller is further configured to, based on the measured voltage satisfying the voltage disconnect threshold, disconnect the respective load from the power distribution network.

5. The system according to claim 1, wherein the connector controller is further configured to disconnect the respective load from the power distribution network based on the measured voltage satisfying the voltage disconnect threshold for at least a predetermined time period.

6. The system according to claim 1, wherein the signal is based on at least one of:
a voltage disconnect range, and
a voltage disconnect function,
wherein the connector controller is further configured to determine the voltage disconnect threshold based on at least one of the voltage disconnect range and the voltage disconnect function.

7. The system according to claim 1 further comprising an inverter configured to:
receive, via input terminals, direct current (DC) voltage;
be connected, via output terminals, to the plurality of power lines; and
convert the DC at the input terminals to the AC at the output terminals,
wherein the central controller is further configured to control the inverter based on a Pulse Width Modulation signal.

8. The system according to claim 7, wherein the system is configured to operate in an off grid state.

9. The system of claim 1, wherein the connector controller is further configured to determine a connect parameter based on the signal received by the connector transceiver.

10. The system according to claim 9, wherein the connect parameter comprises a voltage connect threshold.

* * * * *